United States Patent
Bito

(10) Patent No.: US 11,170,155 B2
(45) Date of Patent: Nov. 9, 2021

(54) DOCUMENT PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Koji Bito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 187 days.

(21) Appl. No.: 16/158,973

(22) Filed: Oct. 12, 2018

(65) Prior Publication Data

US 2019/0129922 A1    May 2, 2019

(30) Foreign Application Priority Data

Oct. 27, 2017 (JP) .............................. JP2017-208313

(51) Int. Cl.
G06F 40/106     (2020.01)
G06F 3/0481     (2013.01)
G06F 40/169     (2020.01)
G06F 3/0483     (2013.01)
(Continued)

(52) U.S. Cl.
CPC ........ G06F 40/106 (2020.01); G06F 3/04812 (2013.01); G06F 40/169 (2020.01); *G06F 3/0482* (2013.01); *G06F 3/0483* (2013.01); *G06F 3/04817* (2013.01)

(58) Field of Classification Search
CPC .. G06F 40/106; G06F 40/169; G06F 3/04812; G06F 3/0483; G06F 17/212; G06F 17/241; G06F 3/0482; G06F 3/0481
See application file for complete search history.

(56) References Cited

U.S. PATENT DOCUMENTS

| 8,593,418 B2 | 11/2013 | Blow et al. |
| 9,001,051 B2 | 4/2015 | Wang et al. |
| 9,471,215 B2 | 10/2016 | Wang et al. |

(Continued)

FOREIGN PATENT DOCUMENTS

| JP | 2000-066795 A | 3/2000 |
| JP | 2011-028560 A | 2/2011 |

(Continued)

OTHER PUBLICATIONS

DocuWorks 8 Document Handling Software, Fuji Xerox, http://www.fujixerox.co.jp/product/catalog/pdf/docuworks8_1307_7.pdf, pp. 1-13, 2018.

(Continued)

*Primary Examiner* — Quoc A Tran

(74) *Attorney, Agent, or Firm* — Oliff PLC

(57) ABSTRACT

A document processing apparatus includes an operation reception unit and a processing execution unit. The operation reception unit receives an operation for inputting an instruction to a document processing application from a user. The processing execution unit executes, when the operation reception unit receives a single operation, display switching processing for switching, every time the single operation is received, between display and non-display of a button that is assigned an instruction to the document processing application, the button being displayed on a display screen of the document processing application.

10 Claims, 7 Drawing Sheets

(51) Int. Cl.
    *G06F 3/0482*     (2013.01)
    *G06F 17/00*     (2019.01)

(56) References Cited

U.S. PATENT DOCUMENTS

| | | | | |
|---|---|---|---|---|
| 2004/0027312 | A1* | 2/2004 | Owada | G06F 3/04886 345/8 |
| 2013/0271791 | A1* | 10/2013 | Miyazaki | G06F 3/1285 358/2.1 |
| 2017/0357426 | A1* | 12/2017 | Wilson | G06F 3/016 |
| 2017/0374259 | A1* | 12/2017 | Nakamura | H04N 5/23245 |
| 2018/0004750 | A1* | 1/2018 | Mochizuki | G06F 16/24578 |

FOREIGN PATENT DOCUMENTS

| | | | |
|---|---|---|---|
| JP | 2013-538397 A | 10/2013 | |
| JP | 2015-501026 A | 1/2015 | |

OTHER PUBLICATIONS

Aug. 3, 2021 Office Action issued in Japanese Patent Application No. 2017-208313.

* cited by examiner

DOCUMENT PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-208313 filed Oct. 27, 2017.

BACKGROUND

Technical Field

The present invention relates to a document processing apparatus and a non-transitory computer readable medium.

SUMMARY

According to an aspect of the invention, there is provided a document processing apparatus including an operation reception unit and a processing execution unit. The operation reception unit receives, from a user, an operation for inputting an instruction to a document processing application. The processing execution unit executes, when the operation reception unit receives a single operation, display switching processing for, every time the single operation is received, switching between display and non-display of a button that is assigned an instruction to the document processing application, the button being displayed on a display screen of the document processing application.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below.

Figure 1:
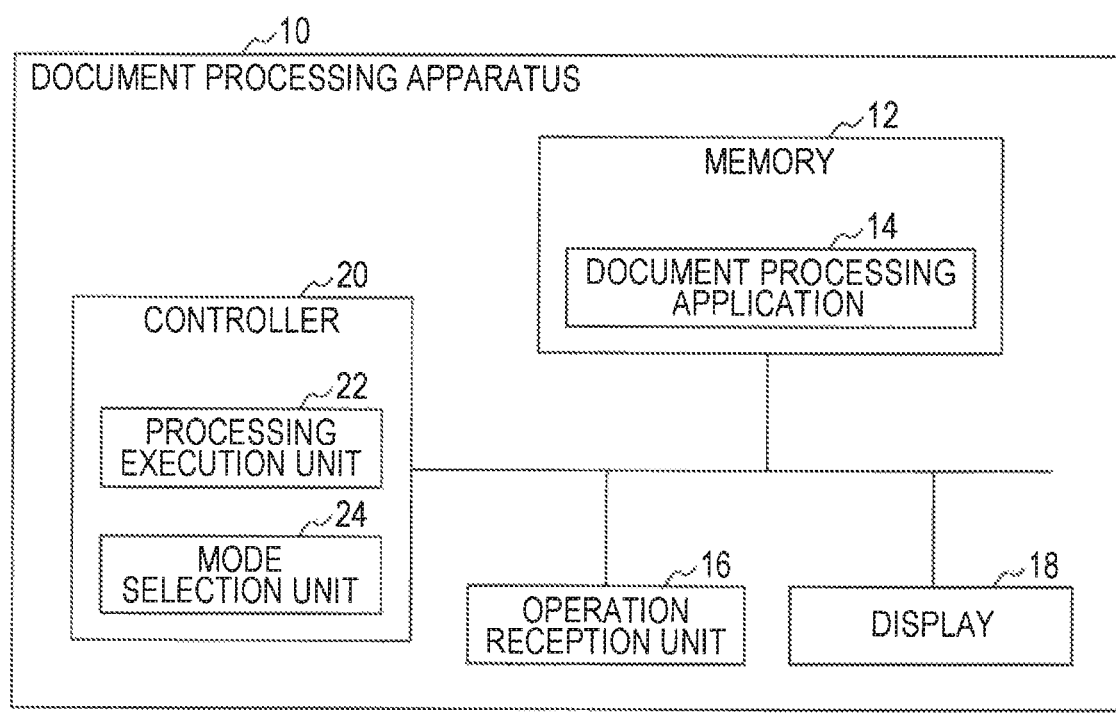
FIG. 1 is a configuration schematic diagram of a document processing apparatus according to an exemplary embodiment.

FIG. 1 is a configuration schematic diagram of a document processing apparatus 10 according to an exemplary embodiment. The document processing apparatus 10 according to this exemplary embodiment is a personal computer. However, a portable terminal such as a tablet terminal may be used as the document processing apparatus 10.

A memory 12 includes, for example, a hard disk, a read only memory (ROM), a random access memory (RAM), and the like. An electronic document as a processing target for the document processing apparatus 10, a processing result of the document processing apparatus 10, and the like are stored in the memory 12. Furthermore, a document processing application 14 that performs processing on an electronic document is installed in the document processing apparatus 10. Accordingly, the document processing application 14 is stored in the memory 12. The details of the document processing application 14 will be described later. Furthermore, a document processing program for executing the document processing application 14 and causing each unit of the document processing apparatus 10 to operate is also stored in the memory 12.

An operation reception unit 16 includes, for example, a mouse, a keyboard, and the like. In the case where the document processing apparatus 10 is a tablet terminal, the operation reception unit 16 may include a touch panel. The operation reception unit 16 receives, from a user, an operation for inputting an instruction to the document processing apparatus 10 in particular, an instruction to the document processing application 14.

A display 18 includes, for example, a liquid crystal panel. The display 18 displays various screen, in particular, a display screen of the document processing application 14.

A controller 20 includes, for example, a central processing unit (CPU). The controller 20 controls each unit of the document processing apparatus 10, in accordance with a document processing program stored in the memory 12. Furthermore, the controller 20 implements functions as a processing execution unit 22 and a mode selection unit 24 when executing the installed document processing application 14.

The processing execution unit 22 executes various types of processing on the document processing application 14, in accordance with instructions from a user to the document processing application 14. The processing executed by the processing execution unit 22 includes not only selection, edition, and storing of an electronic document on the document processing application 14 but also display switching processing for switching between display and non-display of a document display region button, which will be described later. The mode selection unit 24 selects a display mode of a document display region button. The details of processing executed by the processing execution unit 22 and the mode selection unit 24 will be described in detail later.

The details of the document processing application 14 and the details of processing executed by the processing execution unit 22 and the mode selection unit 24 will now be described.

Figure 2:
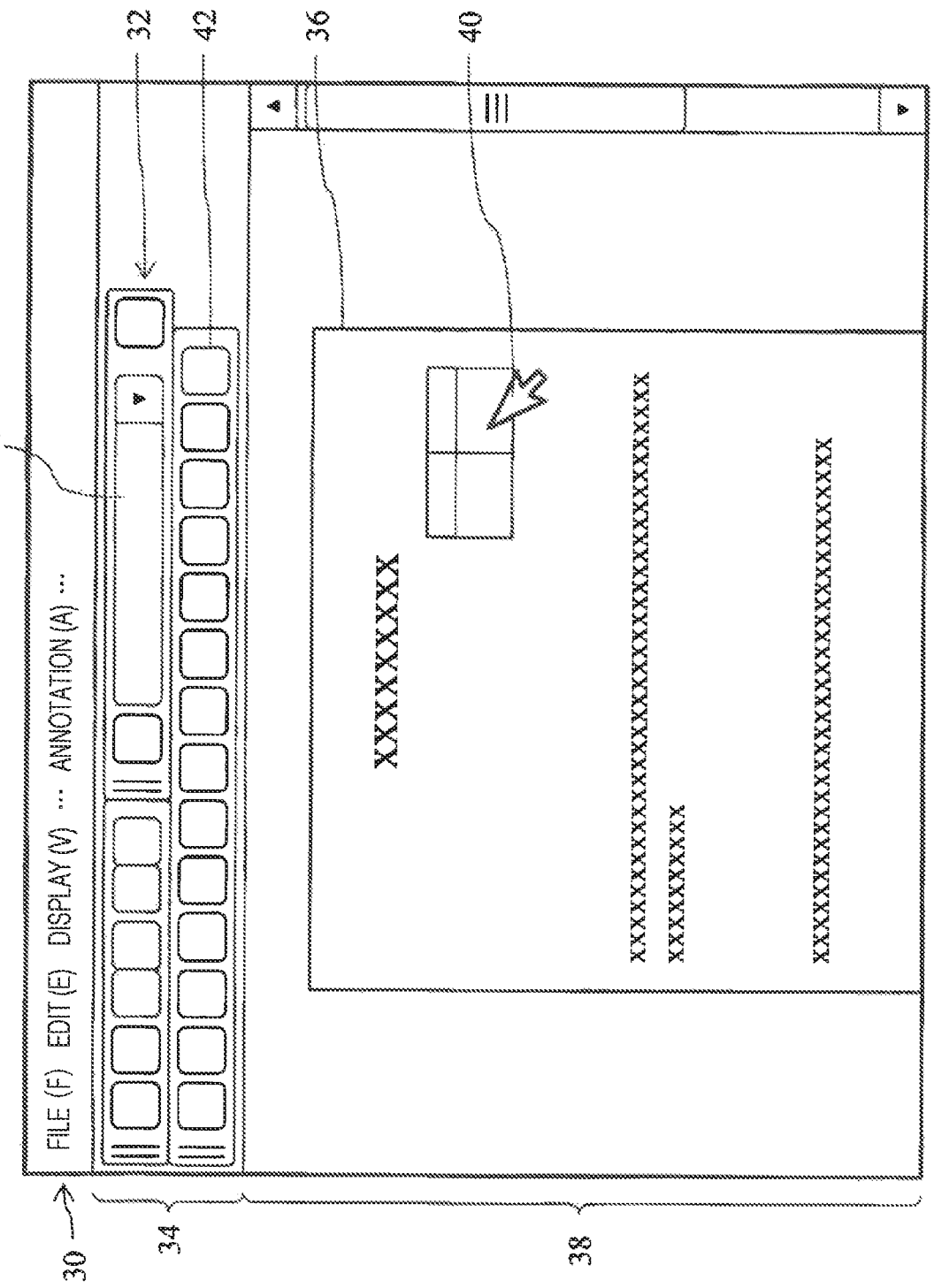
FIG. 2 is a diagram illustrating an example of a display screen of a document processing application according to an exemplary embodiment.

FIG. 2 is a diagram illustrating an example of a display screen of the document processing application 14 displayed on the display 18 (hereinafter, simply described as a "display screen"). The display screen includes a menu bar 30, a tool bar region 34 in which one or more tool bars 32 are displayed, and a document display region 38 in which an electronic document 36 as a processing target is displayed. The display screen may include, in addition to the regions described above, for example, a folder region in which a folder tree of the document processing apparatus 10 is displayed. Furthermore, the size of each region may be changed by a user.

A cursor 40 which moves on a screen in accordance with an operation on the operation reception unit 16 by a user is displayed on the display screen. Specifically, the position of the cursor 40 is changed in accordance with an operation on a mouse as the operation reception unit 16 or in accordance with a dragging operation or tap operation using a finger of a user or a stylus on a touch panel as the operation reception unit 16 in the case where the document processing apparatus 10 is a tablet terminal.

The menu bar 30 includes a main menu including major items such as "file", "edit", and "display". When a user places the cursor 40 on a major item and selects the major item (for example, selection is implemented by, for example, a left-click operation or tap operation on a mouse), detailed instructions are displayed as a dropdown list. When selecting one of the displayed detailed instructions, a user is able to input the instruction to the document processing application 14.

The tool bar 32 is a strip-shaped region that includes buttons 42 each including an icon that is assigned an instruction that may be received by the document processing application 14, an attribute input box 44 to which attributes (for example, a character font) of an annotation, which will be described later, as an object added to the electronic document 36 are input, and the like. For example, a tool bar 32 is provided in association with a major item of the menu bar 30. That is, instructions included in a major item are assigned to the corresponding buttons 42 included in a tool bar 32. For example, the tool bar 32 corresponding to a major item "file" includes the button 42 corresponding to "open file (electronic document)", "save", and the like, which are instructions that may be selected from the major item "file". Alternatively, the tool bar 32 including the plural buttons 42 that are assigned plural instructions selected from plural major items by a user may be displayed.

The tool bar 32 is displayed as described above, and therefore, a user does not need to select an instruction from the menu bar 30 by performing a click or tap operation multiple times. The user is able to input various instructions only by selecting the buttons 42 included in the tool bar 32. However, the tool bar region 34 is located near the document display region 38, and therefore, in the case where, as an instruction execution position, a position within the document display region 38 needs to be specified using the cursor 40, there is a need to perform an operation for selecting the button 42 of the tool bar 32, moving the cursor 40 to a desired position in the document display region 38, and specifying an instruction execution position by a left-click operation or moving the cursor 40 to the tool bar region 34 in the case where a different instruction is to be selected.

Figure 3:
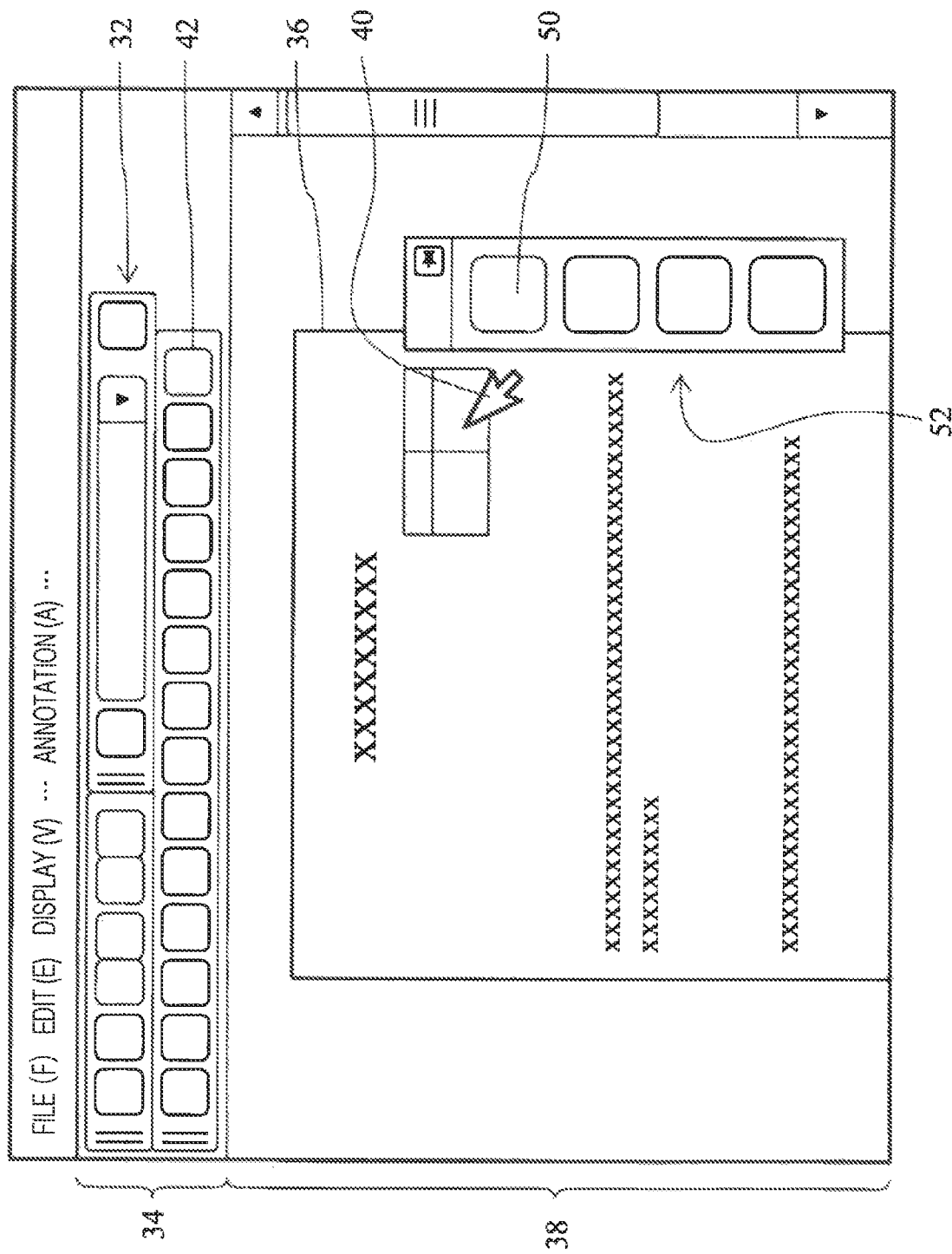
FIG. 3 is a diagram illustrating a state in which document display region buttons are displayed.

FIG. 3 is a diagram illustrating a state in which a document display region button 50 is displayed. In the document processing application 14, one or more document display region buttons 50 each including an icon may be displayed in the document display region 38. In this exemplary embodiment, a tool box 52 including the plural document display region buttons 50 may be displayed within the document display region 38. However, the document display region buttons 50 are not necessarily displayed in this manner.

The plural document display region buttons 50 included in the tool box 52 may be assigned the same instructions for the plural buttons 42 included in the tool bar 32. In this exemplary embodiment, the tool box 52 includes the plural document display region buttons 50 that are assigned instructions for adding annotations to the electronic document 36. Obviously, the plural document display region buttons 50 included in the tool box 52 may be assigned instructions different from instructions for adding annotations. Furthermore, a user may be able to customize instructions to be assigned to the document display region buttons 50 included in the tool box 52. For example, setting may be performed such that an instruction that is often used by a user is selected from the tool bars 32 and the document display region button 50 corresponding to the selected instruction is included in the tool box 52.

An annotation represents an object added to the electronic document 36. In the document processing application 14, the electronic document 36 may be processed as a layer structure including multiple layers. For example, an electronic document body is arranged in a layer 1, and an annotation added by the document processing application 14 is arranged in a layer 2 that is different from the layer in which the electronic document body is arranged. Therefore, an annotation may be represented by an object that is arranged (added) in a layer different from a layer in which an electronic document body is arranged. Annotations include, for example, stamps such as "important", "confidential", and "approved", a marker provided along letters in the electronic document 36, a label to which a comment may be input, and the like.

When a user performs an operation for selecting a button that is assigned an instruction for adding a desired annotation from among the plural document display region buttons 50 and moving the cursor 40 to specify a position to which the annotation is to be added, the annotation may be added to the electronic document 36.

As illustrated in FIG. 3, the document display region buttons 50 are displayed in the document display region 38. Therefore, compared to a case where the button 42 included in the tool bar 32 is used to select an instruction and specify an instruction execution position, the amount of movement of the cursor 40 may be reduced. That is, processing may be performed with a simpler operation. In particular, in annotation adding processing, various annotations may be repeatedly added while switching between the annotations. In such a case, more effect may be achieved by a simplified operation. Furthermore, the tool box 52 including the plural document display region buttons 50 corresponding to plural annotations are displayed near the electronic document 36, and therefore, a user is able to perform annotation adding processing with a feeling (operation feeling) as if the user writes or stamp on a paper document in a state in the real world in which a pencil case including various stationeries is placed next to the pencil case.

In contrast, the document display region buttons 50 are displayed in the document display region 38, and therefore, the document display region buttons 50 may be in the way in some cases. For example, in the example of FIG. 3, in the case where two pages of the electronic document 36 are displayed side by side, the document display region buttons 50 or the tool box 52 may be superimposed on the electronic document 36. Therefore, the visibility of the electronic document 36 may be reduced.

Thus, in the document processing application 14, switching between display and non-display of the document display region buttons 50 may be performed by a single operation by a user. A single operation represents a single simple operation, and may be, for example, a single-click operation or a double-click operation for the case where the operation reception unit 16 is a mouse, an operation for depressing a key once for the case where the operation reception unit 16 is a keyboard, a single tap operation or flick operation for the case where the operation reception unit 16 is a touch panel, or the like. The details of a single operation for display switching processing may be set in a fixed manner in advance or may be changed by a user.

In this exemplary embodiment, switching between display and non-display of the tool box 52 including the plural document display region buttons 50 may be performed by a single operation. When the operation reception unit 16 receives a preset single operation during execution of the document processing application 14, the processing execution unit 22 performs display switching processing for the tool box 52. That is, the processing execution unit 22 performs processing for causing the tool box 52 to be displayed in the case where the tool box 52 is not displayed at the time when the single operation is received, and performs processing for causing the tool box 52 not to be displayed in the case where the tool box 52 is displayed at the time when the single operation is received. As described above, in the case where the operation reception unit 16 receives a single operation, the processing execution unit 22 performs display switching processing for the tool box 52. Therefore, a user is able to switch between display and non-display of the tool box 52 (that is, display and non-display of the document display region buttons 50) by a simple operation.

The processing execution unit 22 causes the tool box 52 to be displayed near the position of the cursor 40 at the time when the operation reception unit 16 receives a single operation. It is assumed that a user normally causes the tool box 52 to be displayed when the user desires to input an instruction corresponding to the document display region button 50. Therefore, by causing the tool box 52 to be displayed near the position of the cursor 40 at the time when the operation reception unit 16 receives a single operation, the amount of movement of the cursor 40 to select the document display region button 50 may be reduced. That is, an operation using the document display region button 50 may further be simplified.

In this exemplary embodiment, in the case where the operation reception unit 16 receives a single operation when the position of the cursor 40 is at any position within the document display region 38, the processing execution unit 22 performs display switching processing for the tool box 52. In other words, the document display region buttons 50 may be displayed by a single operation, regardless of the position of the cursor 40, as long as the cursor 40 is within the document display region 38. Furthermore, the tool box 52 is displayed near the cursor 40 at any position within the document display region 38, and therefore, a user is able to cause the document display region buttons 50 to be displayed at any position within the document display region 38.

A single operation is also used as an operation for inputting a different instruction (that is, an instruction other than an instruction for display switching processing) to the document processing application 14. That is, a single operation for display switching processing is common to an operation for inputting a different instruction. Therefore, when the operation reception unit 16 receives a single operation, the processing execution unit 22 determines whether display switching processing for the tool box 52 or a different instruction is to be executed. Specifically, when the operation reception unit 16 receives a single operation, if the document processing application 14 is in a state in which a different instruction is executable, the processing execution unit 22 executes the different instruction, instead of executing display switching processing, and if the document processing application 14 is in a state in which a different instruction is not executable, the processing execution unit 22 performs display switching processing for the tool box 52. This is because it may be determined that a single operation performed by a user when the document processing application 14 is in a state in which a different instruction is executable represents that the user desires to execute the different instruction. Therefore, in such a case, the processing execution unit 22 respects the intention of the user and performs the different instruction, instead of executing display switching processing for the tool box 52.

A specific example of processing of the processing execution unit 22 when receiving a single operation will be explained below with reference to FIGS. 4 and 5. In this exemplary embodiment, a single operation represents a left-click operation on a mouse as the operation reception unit 16, and hereinafter, explanation will be provided for the case where a single operation is a left-click operation.

Figure 4:
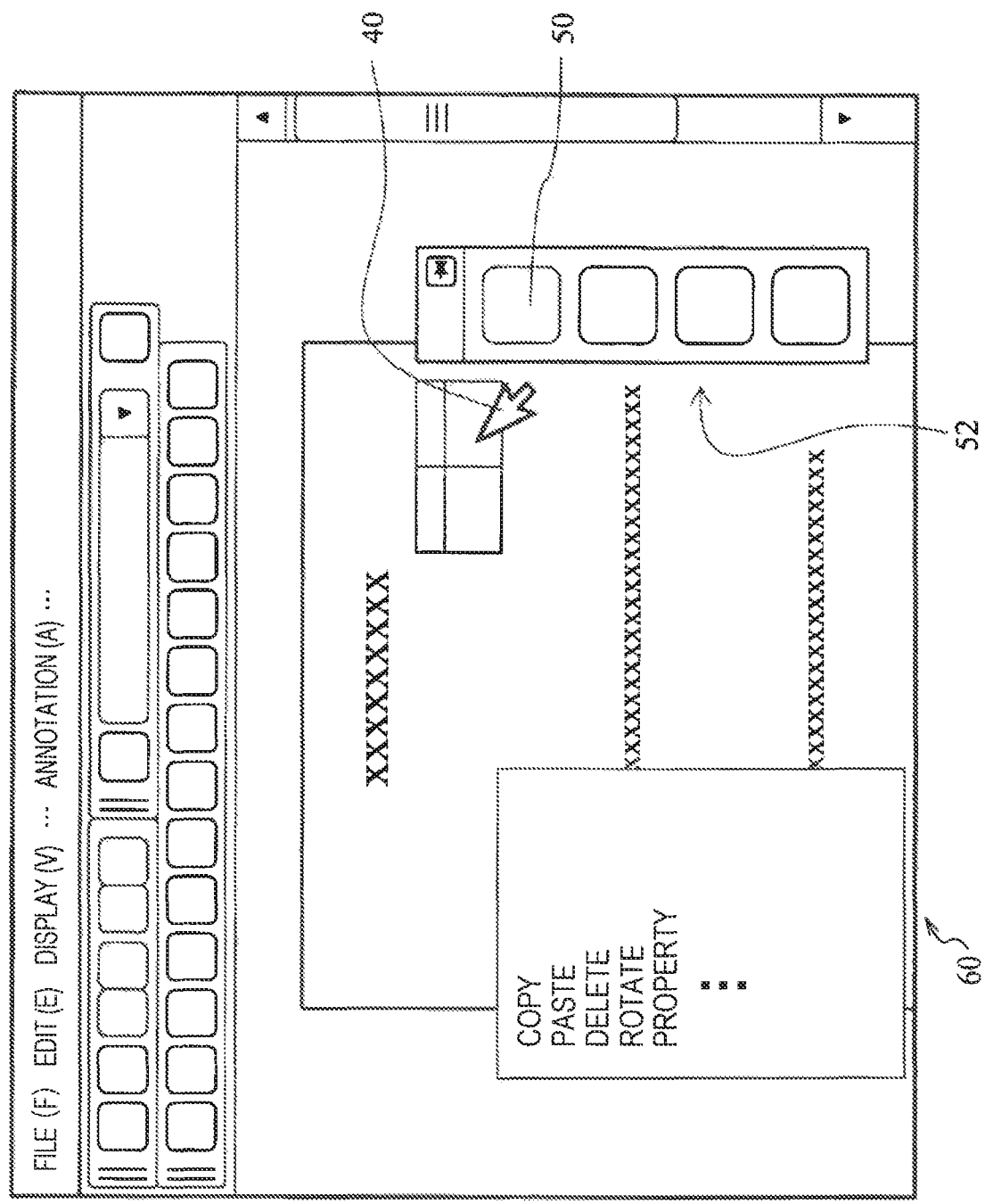
FIG. 4 is a diagram illustrating a state in which a context menu is displayed.

FIG. 4 is a diagram illustrating a state in which a context menu 60 is displayed. The context menu 60 is a menu displayed by a user operation and is displayed, for example, when a right-clicking operation on the mouse is performed. In the case where the context menu 60 is displayed, when a left-click operation as a single operation is performed in a state in which the cursor 40 is placed on an item of the context menu 60, an instruction for selecting the item, which is a different instruction, is executed. Furthermore, when a left-click operation is performed in a state in which the cursor 40 is placed at a position outside the display region of the context menu 60, an instruction for causing the context menu 60 not to be displayed, as a different instruction, is executed.

That is, the state in which the context menu 60 is displayed may be defined as a state in which a different instruction is executable. Therefore, when the operation reception unit 16 receives a left-click operation in a state in which the context menu 60 is displayed, the processing execution unit 22 executes a different instruction, instead of executing display switching processing for the tool box 52.

Figure 5:
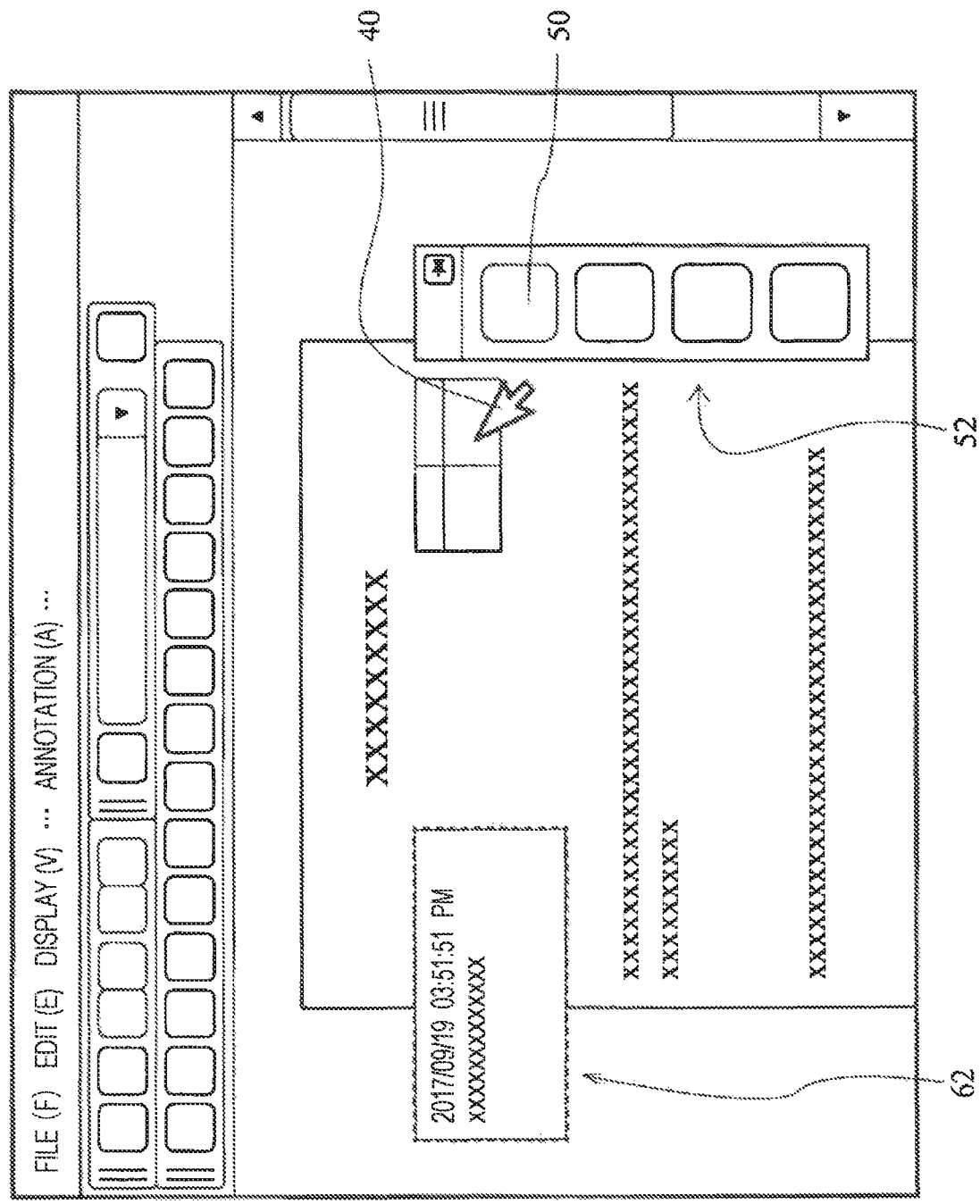
FIG. 5 is a diagram illustrating a state in which a label annotation is displayed.

FIG. 5 is a diagram illustrating a state in which a label annotation 62 is selected and has entered the selected state. The label annotation 62 may be set to the selected state for further edition (movement, change of a comment, or the like). In the case where the label annotation 62 is in the selected state, when a left-click operation is performed in a state in which the cursor 40 is placed on the label annotation 62, an instruction for entering (activating) a mode for editing a character string of the label annotation 62, as a different instruction, is executed. Furthermore, when a left-click operation is performed in a state in which the cursor 40 is placed at a position outside the display region of the label annotation 62, an instruction for canceling the selected state of the label annotation 62, as a different instruction, is executed.

That is, the state in which the label annotation 62 is in the selected state represents a state in which a different instruction is executable. Therefore, in the case where the operation reception unit 16 receives a left-click operation when the label annotation 62 is in the selected state, the processing execution unit 22 executes a different instruction, instead of executing display switching processing for the tool box 52.

The state in which a different instruction is executable illustrated in FIGS. 4 and 5 is merely an example. The state in which a different instruction is executable may include various states. For example, in a state in which the label annotation 62 in an activated state is displayed, left-clicking causes an instruction for determining (deactivating) a character string, as a different instruction, to be executed. Therefore, in the case where the operation reception unit 16 receives a left-click operation in this state, the processing execution unit 22 executes a different instruction, instead of executing display switching processing for the tool box 52. Furthermore, in the state in which the cursor 40 is placed on an object (the button 42 of the tool bar 32, the document display region button 50 of the tool box 52, an annotation, or the like), left-clicking causes an instruction for selecting the object to be executed. Therefore, when the operation reception unit 16 receives a left-click operation in the state in which the cursor 40 is placed on an object, the processing execution unit 22 executes a different instruction, instead of executing display switching processing for the tool box 52. As described above, the state of the document processing application 14 includes the position of the cursor 40.

In contrast, in the case where the document processing application 14 is in a state in which a different instruction is not executable, for example, in a state in which the context menu 60 or the label annotation 62 in the selected state is not displayed, the cursor 40 is placed within the document display region 38, and the cursor 40 is not placed on any object, even if the operation reception unit 16 receives a left-click operation, the processing execution unit 22 is not able to execute different processing in accordance with the received single operation. Therefore, in the cease where the operation reception unit 16 receives a left-click operation in this state, the processing execution unit 22 performs display switching processing for the tool box 52.

As described above, in this exemplary embodiment, a single operation is represented by a left-click operation on a mouse. That is, a left-click operation, which is generally used as an operation for performing "determination", may achieve execution of display switching processing for the tool box 52. Accordingly, a user is able to perform, only by left-click operations, a series of processing operations including causing the document display region buttons 50 to be displayed, selecting an instruction, specifying an instruction execution position, and causing the document display region buttons 50 not to be displayed. That is, the user does not need to combine plural types of operations to perform the above-mentioned series of processing operations. That is, by performing a left-click operation as a single operation to perform display switching processing for the document display region buttons 50, an operation for processing on the electronic document 36 may further be simplified.

The mode selection unit 24 selects a display mode of the tool box 52 (that is, a display mode of the document display region buttons 50) from among multiple display modes prepared in advance. In this exemplary embodiment, the mode selection unit 24 may select a display mode of the tool box 52 from among three modes: a display switching mode in which switching between display and non-display of the tool box 52 may be performed by a single operation as described above; a fixed display mode in which the tool box 52 is displayed at all time; and a non-display mode in which the tool box 52 is not displayed.

The mode selection unit 24 selects a display mode of the tool box 52 in accordance with an instruction from a user. Specifically, in a setting item for switching between effective and non-effective of the tool box 52 that is included in a major item "display" of the menu bar 30, the mode selection unit 24 selects the display switching mode when a user selects "effective", and the mode selection unit 24 selects the non-display mode when the user selects "non-effective". In the case where the tool bar 32 includes the button 42 that is assigned an instruction for switching between effective and non-effective of the tool box 52, when the user selects the corresponding button 42, switching between effective and non-effective of the tool box 52 may be performed.

In the non-display mode, when the operation reception unit 16 receives a single operation, even if the cursor 40 is placed within the document display region 38 and the document processing application 14 is in a state in which a different instruction is not executable, the processing execution unit 22 does not display the tool box 52.

Figure 6:
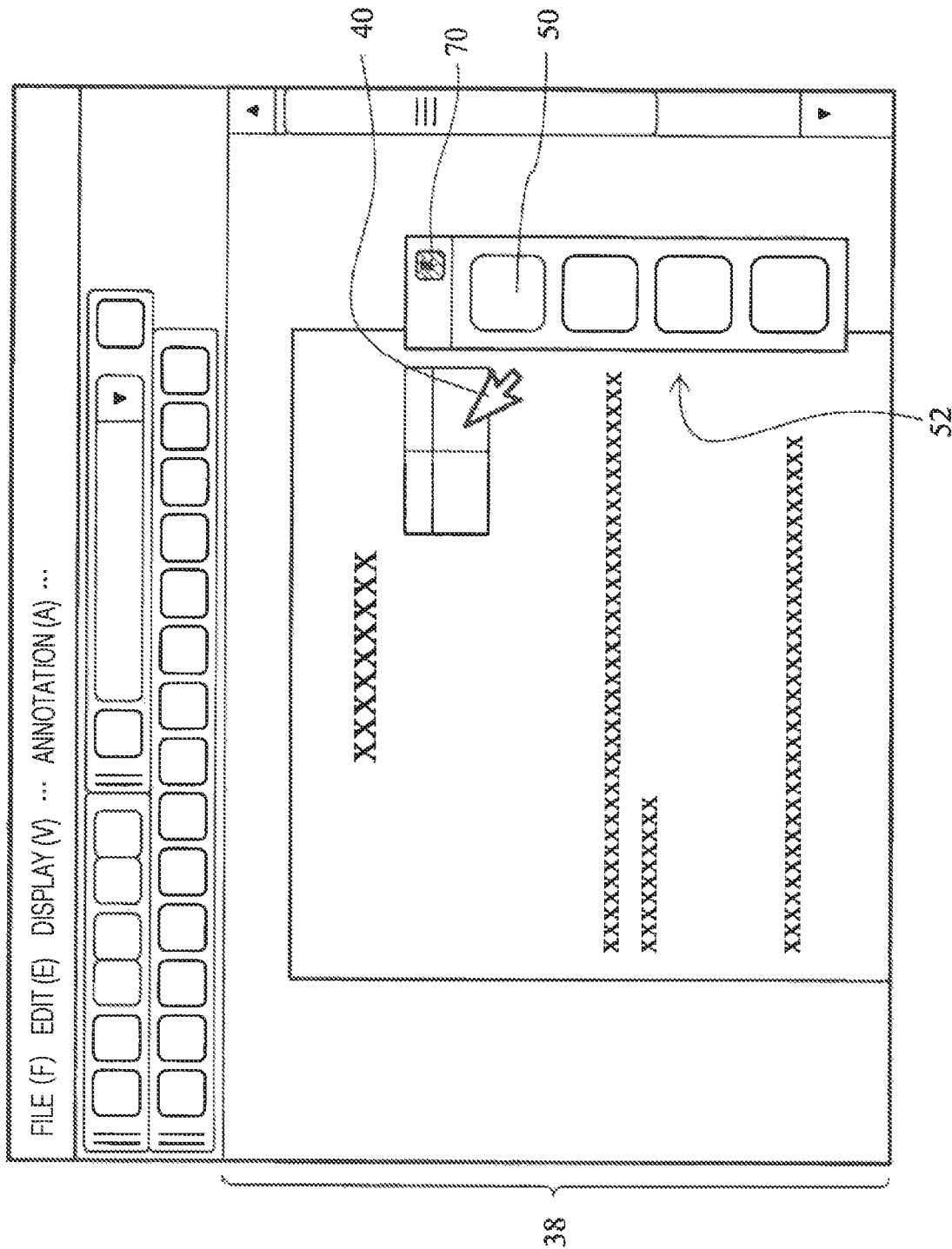
FIG. 6 is a diagram illustrating a state in which a fixed display mode is selected.

Furthermore, as illustrated in FIG. 6, the tool box 52 includes a fixing button 70. When a user selects the fixing button 70, the mode selection unit 24 selects a fixed display mode. When a user performs a dragging operation for the tool box 52 (an operation for pressing a left button of a mouse in a state in which the cursor 40 is placed on the tool box 52 and changing the position of the cursor 40 while the left button being pressed), the mode selection unit 24 selects the fixed display mode.

As illustrated in FIG. 6, when the fixed display mode is selected, the display form of the fixing button 70 is changed. That is, by confirming the fixing button 70, a user is able to understand whether the display mode of the tool box 52 is the display switching mode or the fixed display mode. In the fixed display mode, when the operation reception unit 16 receives a single operation, even if the cursor 40 is placed within the document display region 38 and the document processing application 14 is in the state in which a different instruction is not executable, the processing execution unit 22 does not cause the tool box 52 not to be displayed.

The above-described operation for changing the display mode of the tool box 52 is merely an example. The mode selection unit 24 may change the display mode of the tool box 52 in accordance with a different operation performed by a user.

A user is able to switch the display mode of the tool box 52 in accordance with the use condition of the document processing application 14. For example, for processing for continuously adding annotations to the electronic document 36, by selecting the fixed display mode, a user is able to avoid the tool box 52 from being intentionally caused not to be displayed and arrange the tool box 52 in any position in a fixed manner. Accordingly, the user is able to comfortably perform an operation.

Figure 7:
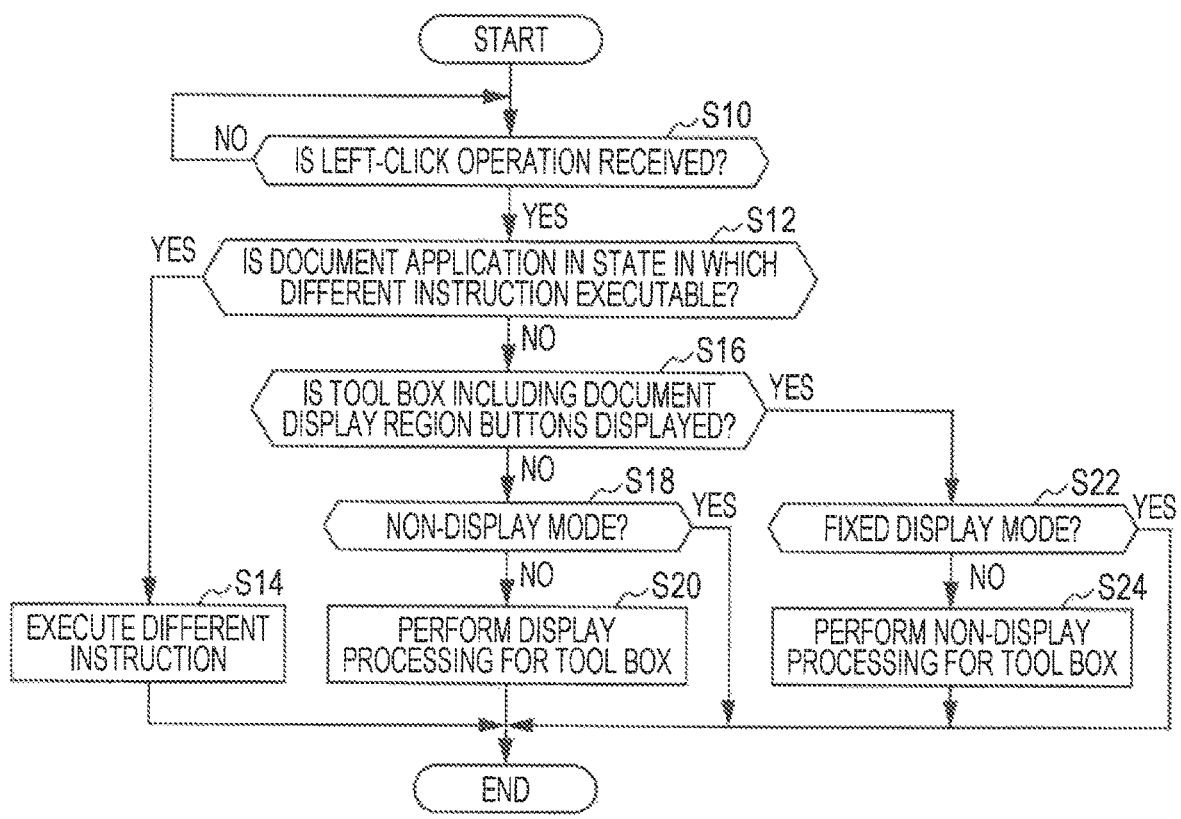
FIG. 7 is a flowchart illustrating the flow of a process of a document processing apparatus according to an exemplary embodiment.

The flow of a process of the document processing apparatus 10 will be described below with reference to a flowchart illustrated in FIG. 7.

In step S10, the processing execution unit 22 determines whether or not the operation reception unit 16 receives a left-click operation as a single operation. The processing execution unit 22 waits until the operation reception unit 16 receives a left-click operation, and executes processing corresponding to an operation other than left-clicking performed by a user while waiting for a left-click operation. When the operation reception unit 16 receives a left-click operation, the process proceeds to step S12.

In step S12, the processing execution unit 22 determines whether or not the state of the document processing application 14 including the position of the cursor 40 is a state in which a different instruction other than display switching processing for the tool box 52 is executable. In the case where a different instruction is executable, the process proceeds to step S14. In step S14, the processing execution unit 22 executes the different instruction, instead of executing the display switching processing for the tool box 52, and ends the process. In the case where a different instruction is not executable, the process proceeds to step S16.

In step S16, the processing execution unit 22 determines whether or not the tool box 52 is displayed. In the case where it is determined that the tool box 52 is not displayed, the process proceeds to step S18.

In step S18, the processing execution unit 22 determines whether or not the display mode of the tool box 52 is the non-display mode. In the case where the display mode of the tool box 52 is the non-display mode, the processing execution unit 22 ends the process, without executing display processing for the tool box 52. In the case where the display mode of the tool box 52 is not the non-display mode, the process proceeds to step S20.

In step S20, the processing execution unit 22 executes display processing for causing the tool box 52 to be displayed near the cursor 40.

In the case where it is determined in step S16 that the tool box 52 is displayed, the process proceeds to step S22. In step S22, the processing execution unit 22 determines whether or not the display mode of the tool box 52 is the fixed display mode. In the case where the display mode of the tool box 52 is the fixed display mode, the processing execution unit 22 ends the process, without executing non-display processing for the tool box 52. In the case where the display mode of the tool box 52 is not the fixed display mode, the process proceeds to step S24.

In step S24, the processing execution unit 22 executes non-display processing for causing the tool box 52 not to be displayed.

Exemplary embodiments of the present invention have been described above. However, the present invention is not limited to the foregoing exemplary embodiments. Various modifications may be made to the present invention without departing from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus comprising:
a processor programmed to:
   display a document image on a document display region;
   receive a click operation on a mouse, the mouse having a first portion and a second portion;
   execute display switching processing by:
      switching from non-display of a tool box to display of the tool box when a click operation on the first portion is received in a state in which a cursor is placed within the document display region, the tool box being assigned an instruction for the document; and
      switching from display of the tool box to non-display of the tool box when the click operation on the first portion is received in a case where the tool box is displayed within the document display region.

2. The document processing apparatus according to claim 1, wherein the processor is programmed to:
not switch from non-display of the tool box to display of the tool box, when a click operation on the first portion is received in a state in which a cursor is placed within the document display region at a location where different processing other than switching from non-display of a tool box to display of the tool box is executable.

3. The document processing apparatus according to claim 1, wherein the processor is programmed to display a tool bar assigned an instruction to the document in a region different from the document display region, the tool box including at least the instruction in the tool bar.

4. The document processing apparatus according to claim 1, wherein the processor is programmed to switch from display of the tool box to non-display of the tool box, when a click operation on the first portion is received in a state in which a cursor is placed within the document display region and the tool box is displayed within the document display region.

5. The document processing apparatus according to claim 1, wherein the first portion is a left mouse button and the second portion is a right mouse button.

6. A non-transitory computer readable medium storing a program causing a computer to execute a process for document processing, the process comprising:
displaying a document image on a document display region;
receiving a click operation on a mouse, the mouse having a first portion and a second portion;
executing display switching processing by:
   switching from non-display of a tool box to display of the tool box when a click operation on the first portion is received in a state in which a cursor is placed within the document display region, the tool box being assigned an instruction for the document; and
   switching from display of the tool box to non-display of the tool box when the click operation on the first portion is received in a case where the tool box is displayed within the document display region.

7. The computer readable medium according to claim 6, wherein the process further comprises:
not switching from non-display of the tool box to display of the tool box, when a click operation on the first portion is received in a state in which a cursor is placed within the document display region at a location where different processing other than switching from non-display of a tool box to display of the tool box is executable.

8. The computer readable medium according to claim 6, wherein the process further comprises displaying a tool bar assigned an instruction to the document in a region different from the document display region, the tool box including at least the instruction in the tool bar.

9. The computer readable medium according to claim 6, wherein the process further comprises switching from display of the tool box to non-display of the tool box, when a click operation on the first portion is received in a state in which a cursor is placed within the document display region and the tool box is displayed within the document display region.

10. The computer readable medium according to claim 6, wherein the first portion is a left mouse button and the second portion is a right mouse button.

* * * * *